US010749916B2

(12) United States Patent
Anders et al.

(10) Patent No.: US 10,749,916 B2
(45) Date of Patent: *Aug. 18, 2020

(54) COGNITIVE HEADSET AWARENESS WITH EXTERNAL VOICE INTERRUPTION DETECTION

(71) Applicant: International Business Machines Corporation, Armonk, NY (US)

(72) Inventors: Kelley Anders, East New Market, MD (US); Jeremy R. Fox, Georgetown, TX (US); Grant D. Miller, Arvada, CO (US)

(73) Assignee: International Business Machines Corporation, Armonk, NY (US)

( * ) Notice: Subject to any disclaimer, the term of this patent is extended or adjusted under 35 U.S.C. 154(b) by 204 days.

This patent is subject to a terminal disclaimer.

(21) Appl. No.: 15/848,125

(22) Filed: Dec. 20, 2017

(65) Prior Publication Data
US 2019/0068663 A1 Feb. 28, 2019

Related U.S. Application Data

(63) Continuation of application No. 15/686,488, filed on Aug. 25, 2017.

(51) Int. Cl.
G06F 15/16 (2006.01)
H04L 29/06 (2006.01)
(Continued)

(52) U.S. Cl.
CPC ...... H04L 65/4038 (2013.01); H04L 65/1089 (2013.01); H04L 65/1096 (2013.01);
(Continued)

(58) Field of Classification Search
CPC ............. H04L 65/4038; H04L 65/1089; H04L 65/403; H04N 7/15
See application file for complete search history.

(56) References Cited

U.S. PATENT DOCUMENTS 5,862,388 A * 1/1999 Danneels .................. G06T 1/00
348/E7.082
5,991,637 A 11/1999 Mack, II et al.
(Continued)

FOREIGN PATENT DOCUMENTS

JP 2006023773 1/2006
JP 2007334968 12/2007

OTHER PUBLICATIONS

Anonymously, "A Cognitive Sensor Based Headphone System/Mobile Device for Power Loss Minimization and Audio Arbitration," ip.com, IPCOM000247618D, Sep. 20, 2016, 3 pages.
(Continued)

Primary Examiner — Razu A Miah
(74) Attorney, Agent, or Firm — VanLeeuwen & Van Leeuwen; Alexander G. Jochym

(57) ABSTRACT

An approach is provided in which an information handling system invokes a conferencing session over a computer network between a first user utilizing a headset and one or more second users. The information handling system detects an audible interruption from a third user proximate to the first user, while the headset inhibits the first user from detecting the audible interruption. Next, the information handling system sends an interruption notification to the first user in response to determining that the audible interruption matches at least one of a set of notification triggers corresponding to the first user. In turn, the information handling system captures a dialog between the one or more second users in the conferencing session in response to the first user accepting the interruption notification.

7 Claims, 7 Drawing Sheets

(51) Int. Cl.
*H04M 3/20* (2006.01)
*H04N 7/15* (2006.01)
*H04M 3/56* (2006.01)
*H04M 1/725* (2006.01)
*H04M 3/42* (2006.01)

(52) U.S. Cl.
CPC ...... *H04L 65/403* (2013.01); *H04M 1/72563* (2013.01); *H04M 3/20* (2013.01); *H04M 3/568* (2013.01); *H04N 7/155* (2013.01); *H04M 3/42221* (2013.01); *H04M 2203/305* (2013.01); *H04M 2250/62* (2013.01); *H04N 7/15* (2013.01)

(56) References Cited

U.S. PATENT DOCUMENTS

| | | | |
|---|---|---|---|
| 7,496,387 B2 | 2/2009 | Byford et al. | |
| 8,112,280 B2* | 2/2012 | Lu | G10L 15/222 704/270 |
| 8,150,323 B2 | 4/2012 | Kim | |
| 8,537,246 B2 | 9/2013 | Samadani | |
| 8,583,735 B2* | 11/2013 | Nagpal | H04L 65/1063 709/204 |
| 8,595,296 B2* | 11/2013 | Berberian | H04M 3/42221 709/204 |
| 8,692,864 B2* | 4/2014 | Angelo | H04N 7/152 348/14.03 |
| 8,825,783 B1* | 9/2014 | Nace | H04L 12/1813 709/206 |
| 9,197,736 B2 | 11/2015 | Davis et al. | |
| 9,324,322 B1 | 4/2016 | Torok | |
| 2003/0023672 A1* | 1/2003 | Vaysman | H04L 12/1827 709/203 |
| 2003/0058805 A1* | 3/2003 | Meyerson | H04L 51/36 370/260 |
| 2004/0128353 A1* | 7/2004 | Goodman | H04L 51/04 709/204 |
| 2005/0272477 A1* | 12/2005 | Boykins | H04M 1/6066 455/569.1 |
| 2007/0086365 A1* | 4/2007 | Chen | H04L 65/403 370/260 |
| 2008/0037746 A1 | 2/2008 | Dufrene | |
| 2008/0165245 A1* | 7/2008 | Sarkar | H04L 12/1827 348/14.09 |
| 2008/0165707 A1* | 7/2008 | Baird | H04L 65/607 370/260 |
| 2008/0297587 A1 | 12/2008 | Kurtz | |
| 2009/0248420 A1 | 10/2009 | Basir et al. | |
| 2011/0029893 A1* | 2/2011 | Roberts | G06Q 10/10 715/753 |
| 2011/0145319 A1* | 6/2011 | Dolan | H04L 47/72 709/203 |
| 2011/0161076 A1 | 6/2011 | Davis | |
| 2012/0069983 A1* | 3/2012 | Sall | H04M 3/563 379/202.01 |
| 2012/0189129 A1* | 7/2012 | Gabara | H04M 1/72569 381/56 |
| 2012/0278408 A1* | 11/2012 | Seferian | G06Q 10/1095 709/206 |
| 2013/0091205 A1* | 4/2013 | Kotler | H04L 65/4015 709/204 |
| 2013/0144603 A1* | 6/2013 | Lord | H04N 5/44543 704/9 |
| 2013/0222519 A1* | 8/2013 | Lee | H04N 7/15 348/14.02 |
| 2013/0279678 A1 | 10/2013 | Beerse | |
| 2013/0314334 A1 | 11/2013 | Leica | |
| 2013/0325951 A1* | 12/2013 | Chakra | H04L 51/24 709/204 |
| 2014/0087704 A1* | 3/2014 | DeCesaris | H04W 4/12 455/416 |
| 2014/0269366 A1* | 9/2014 | Torgersrud | H04L 65/1053 370/252 |
| 2015/0163257 A1* | 6/2015 | Bank | H04L 65/1066 709/204 |
| 2015/0195489 A1* | 7/2015 | Sobti | H04N 7/142 348/14.08 |
| 2015/0304121 A1* | 10/2015 | Wu | H04L 12/1822 709/204 |
| 2015/0319608 A1 | 11/2015 | Varughese | |
| 2015/0339570 A1 | 11/2015 | Scheffler | |
| 2016/0127928 A1* | 5/2016 | McClure | G06F 11/0742 455/425 |
| 2016/0142462 A1* | 5/2016 | Johnston | H04L 65/403 709/205 |
| 2016/0192073 A1* | 6/2016 | Poornachandran | G10L 25/51 381/26 |
| 2016/0277582 A1* | 9/2016 | Sall | H04M 3/563 |
| 2017/0064085 A1 | 3/2017 | Schwebel | |
| 2017/0230439 A1* | 8/2017 | Totzke | H04L 65/1023 |

OTHER PUBLICATIONS

Anonymously, "Cognitive Activation of a Panic Mode of Operation for a Mobile Device," ip.com, IPCOM000244895D, Jan. 27, 2016, 6 pages.

Anonymously, "Context-sensitive personal speech completion aid," ip.com, IPCOM000236313D, Apr. 18, 2014, 5 pages.

"List of IBM Patents or Patent Applications Treated as Related," Letter from Leslie A. Van Leeuwen, Dec. 20, 2017, 1 page.

Anders et al., "Cognitive Headset Awareness with External Voice Interruption Detection," U.S. Appl. No. 15/686,488, filed Aug. 25, 2017, 38 pages.

\* cited by examiner

400

NOTIFICATION TRIGGER CONFIGURATION

INTERRUPTION
NOTIFICATION TYPE

| GLOBAL KEYWORDS | AUDIO | VISUAL |
|---|---|---|
| [x] Fire | [x] | [x] |
| [x] Emergency | [x] | [x] |
| [x] 911 | [x] | [x] |
| [ ] Robbery | [ ] | [ ] |
| [ ] Urgent | [ ] | [ ] |

— 410

USER-DEFINED ALERTS

| | AUDIO | VISUAL |
|---|---|---|
| [x] Mike | [x] | [ ] |
| [x] Dog is sick | [ ] | [x] |
| [x] Come here quick | [ ] | [x] |
| [x] Immediately | [x] | [ ] |
| [x] SupAudio.wav | [x] | [x] |

— 420

DO NOT INTERRUPT

[x] Lunch time
[x] DogBark.wav

— 430

CONTENT CAPTURE CONFIGURATION

[ ] Audio Recording
[x] Transcript of meeting discussion

COGNITIVE HEADSET AWARENESS WITH EXTERNAL VOICE INTERRUPTION DETECTION

BACKGROUND

Communication between people is critical, required, and vital to a business's success. Today's style of communications is dynamic, fluid, and growing in speed. Conferencing sessions, such as video conferencing, have evolved over the years and have vastly improved communications between organizations, customers, and suppliers. Video conferencing minimizes travel time, travel costs, and allows participants in different locations to view/edit the same electronic document. In addition, and of important note, video conferencing allows a participant to see other participants' visual cues that are not available during a traditional telephone conversation.

Video conference participants, however, may be interrupted by nearby personnel from time to time for urgent and not urgent matters. When this occurs, the video conference participant focuses their attention on the person initiating the interruption and, in turn, loses focus, context, and history transpiring on the video conference.

BRIEF SUMMARY

According to one embodiment of the present disclosure, an approach is provided in which an information handling system invokes a conferencing session over a computer network between a first user utilizing a headset and one or more second users. The information handling system detects an audible interruption from a third user proximate to the first user, while the headset inhibits the first user from detecting the audible interruption. Next, the information handling system sends an interruption notification to the first user in response to determining that the audible interruption matches at least one of a set of notification triggers corresponding to the first user. In turn, the information handling system captures a dialog between the one or more second users in the conferencing session in response to the first user accepting the interruption notification.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 4 is an exemplary diagram showing a configuration window to configure an interruption manager;

DETAILED DESCRIPTION

Figure 1:
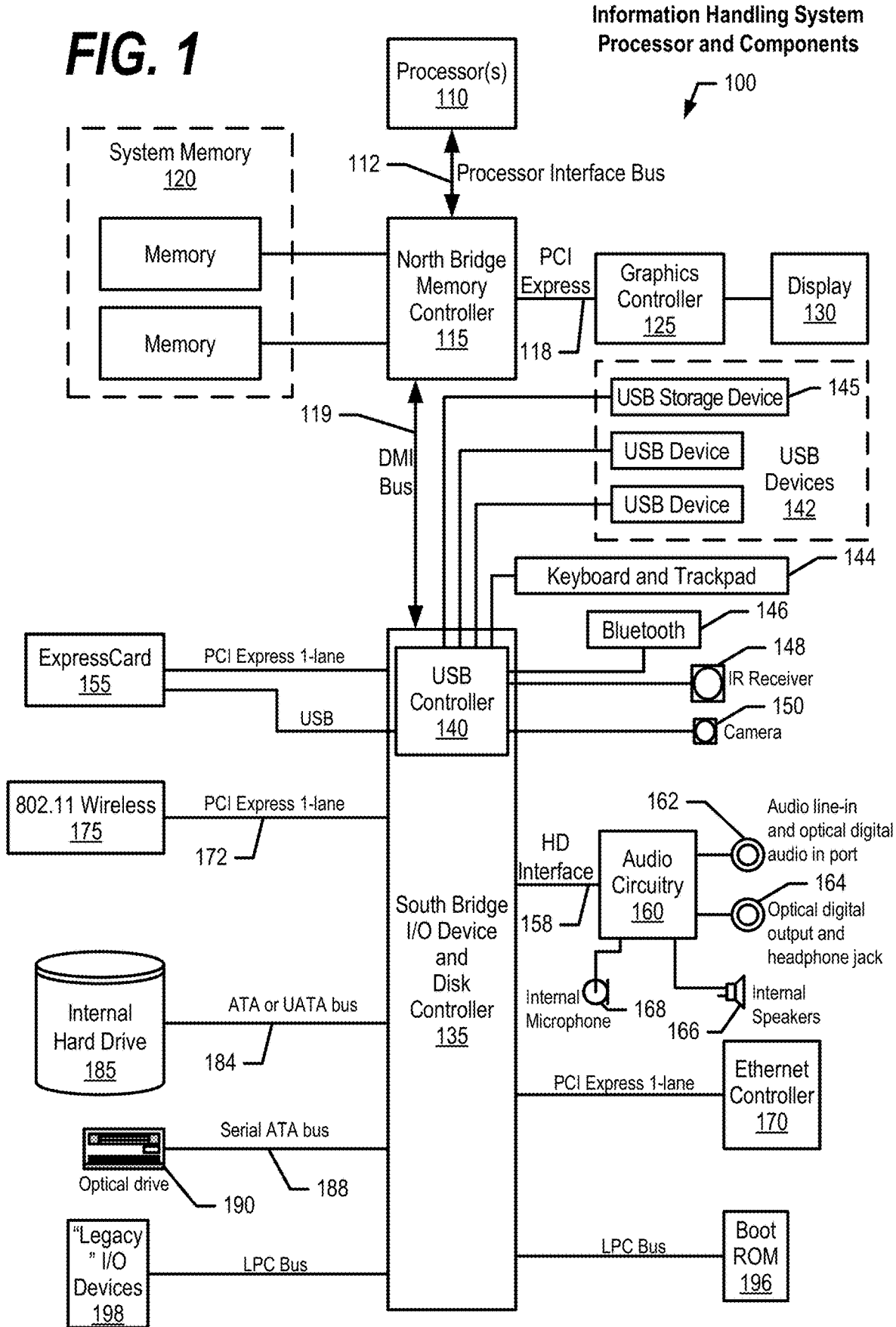
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119.

In one embodiment, the bus is a Direct Media Interface (DMI) bus that transfers data at high speeds in each direction between Northbridge 115 and Southbridge 135. In another embodiment, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
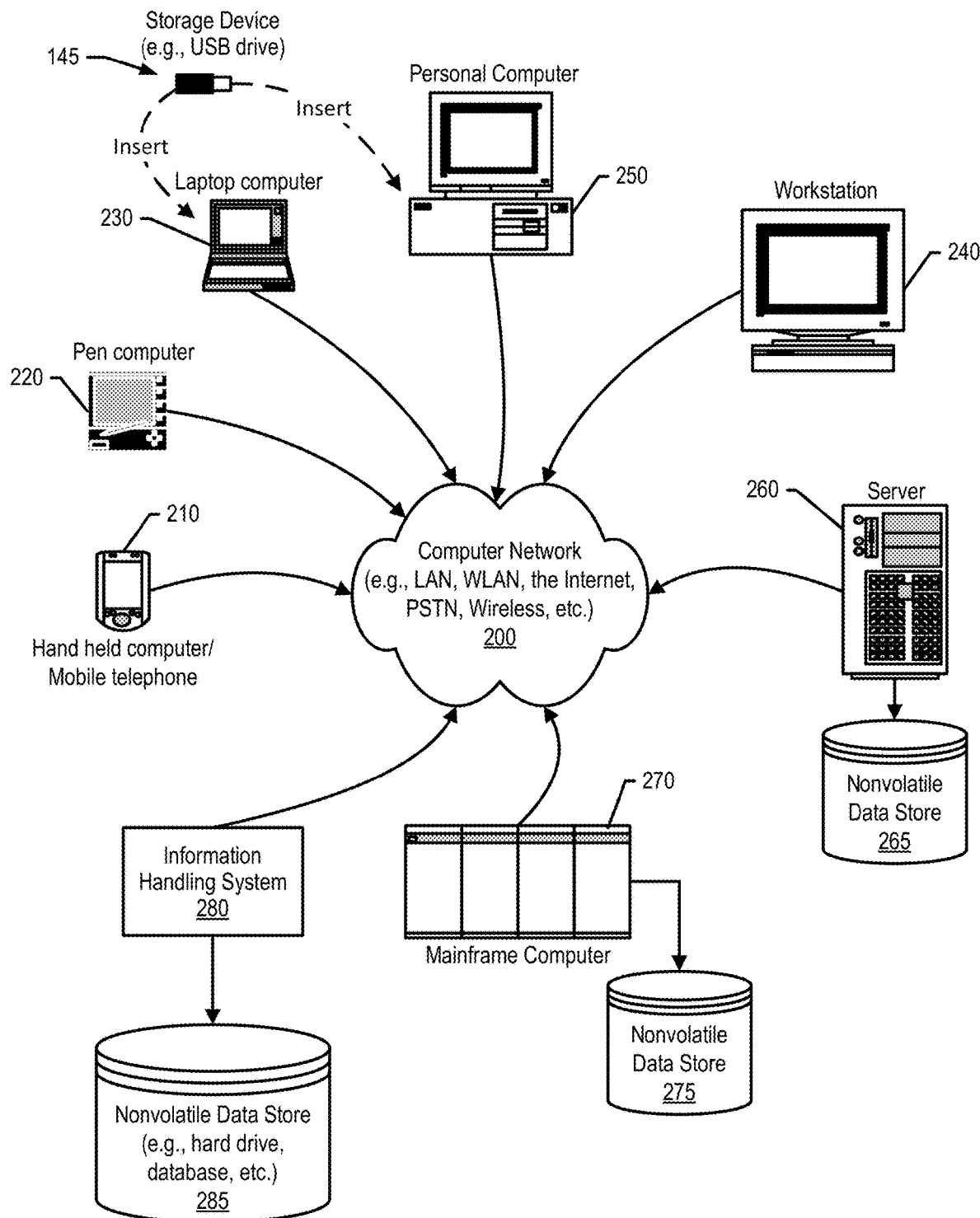
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3 through 7 depict an approach that can be executed on an information handling system. As discussed herein, a headset system is enabled that provides a user with an ability to manage localized interruptions that occur while the user is on a conferencing session, such as an audio conference or video conference. The user configures and trains the headset system to inform the user when "notification triggers" occur in the user's surrounding area, such as a person yelling "fire" or a person saying the user's name. The headset system sends an interruption notification to the user, such as a tone in the head set or a popup window on the user's display. The user determines whether to accept the interruption and, if so, the headset system records a dialog between the other conferencing session participants while the user is attending to the interruption. When the interruption is complete, the headset system replays the record dialog to the user such as through a textual message on the user's display.

Figure 3:
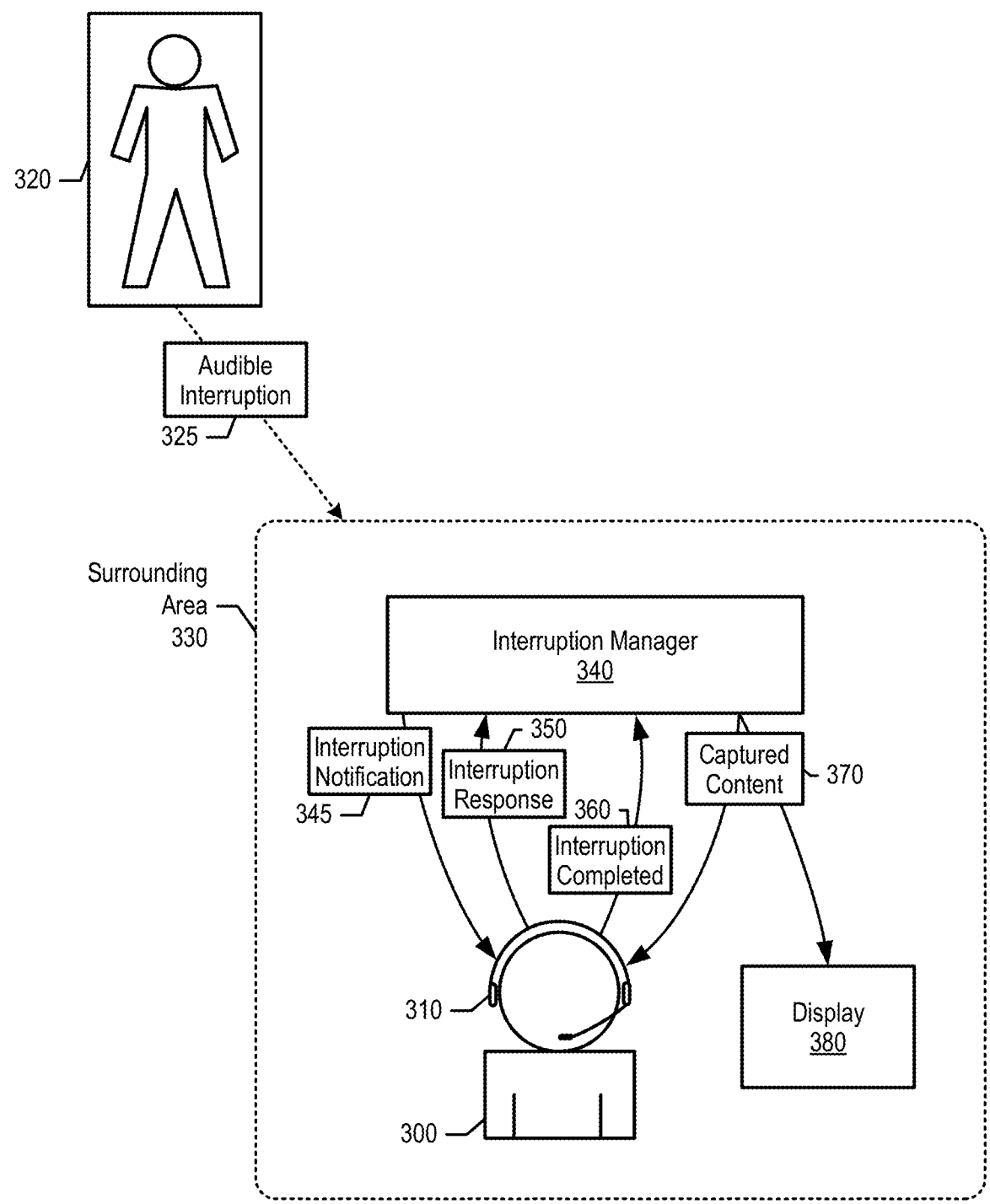
FIG. 3 is a diagram depicting a user managing local interruptions while the user is participating in a conferencing session.

FIG. 3 is a diagram depicting a user managing local interruptions while the user is participating in a conferencing session. User 300 uses headset 310 to participate in a conferencing session, such as an audio conference or a video conference utilizing display 380. Person 320 enters surrounding area 330 proximate to user 300 (e.g., user 300's office) and initiates audible interruption 325. For example, person 320 may enter user 300's office and say user 200's name. Headset 310 inhibits user 300 from hearing person 320's audible interruption 325 (e.g., full ear headset, noise cancelling headset, etc.). However, interruption manager 340 detects audible interruption 325 and proceeds through a series of steps to determine whether user 300 should be notified of the interruption. In one embodiment, interruption manager 340 is integrated into headset 310. In another embodiment, interruption manager 340 may be executing on a computer system utilized by user 300 and receives audio information from via headset 310's microphone. As discussed herein a headset system may include headset 310 or a combination of headset 310 and interruption manager 340.

Figure 5:
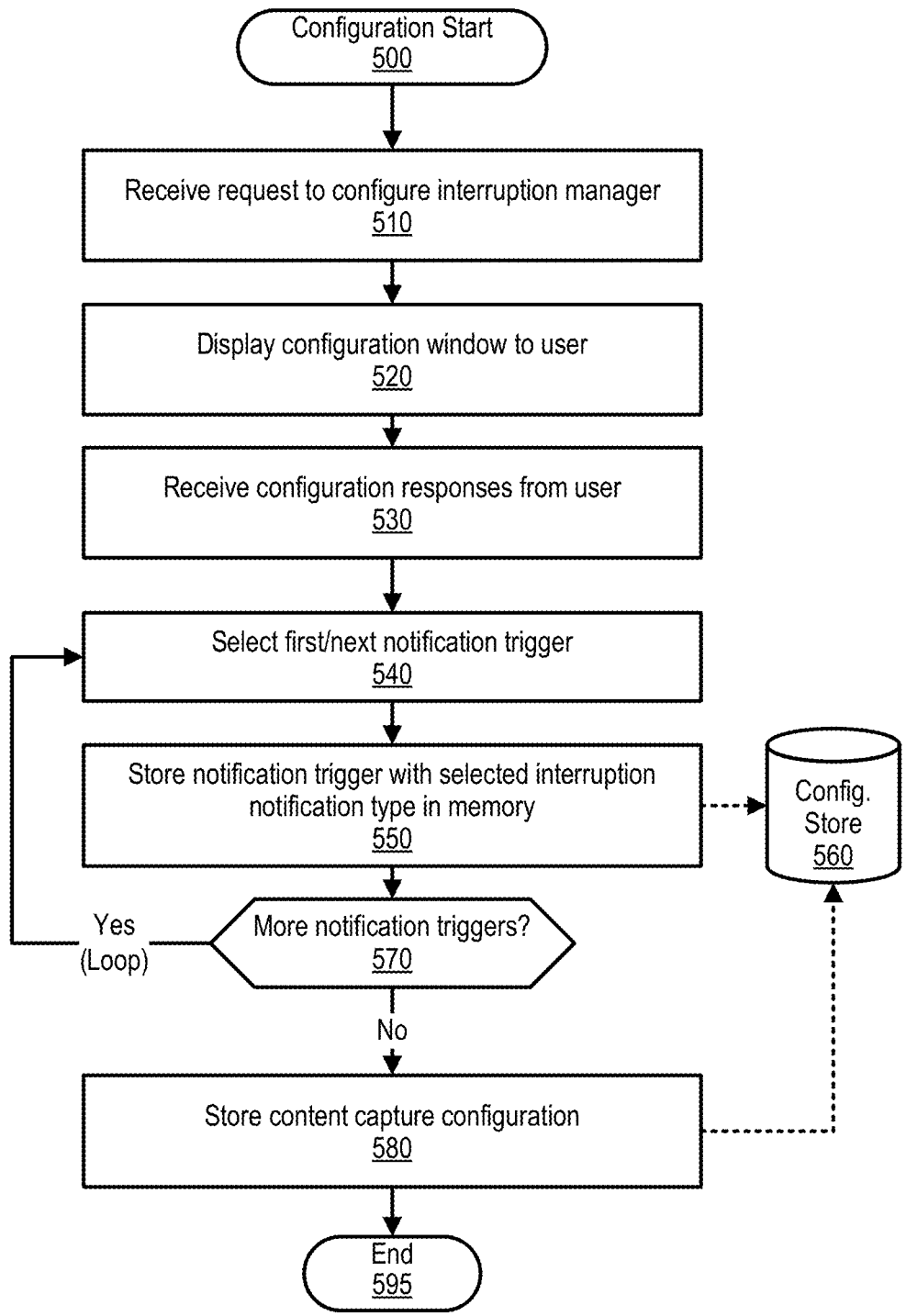
FIG. 5 is an exemplary flowchart showing steps taken to configure an interruption manager.
Figure 7:
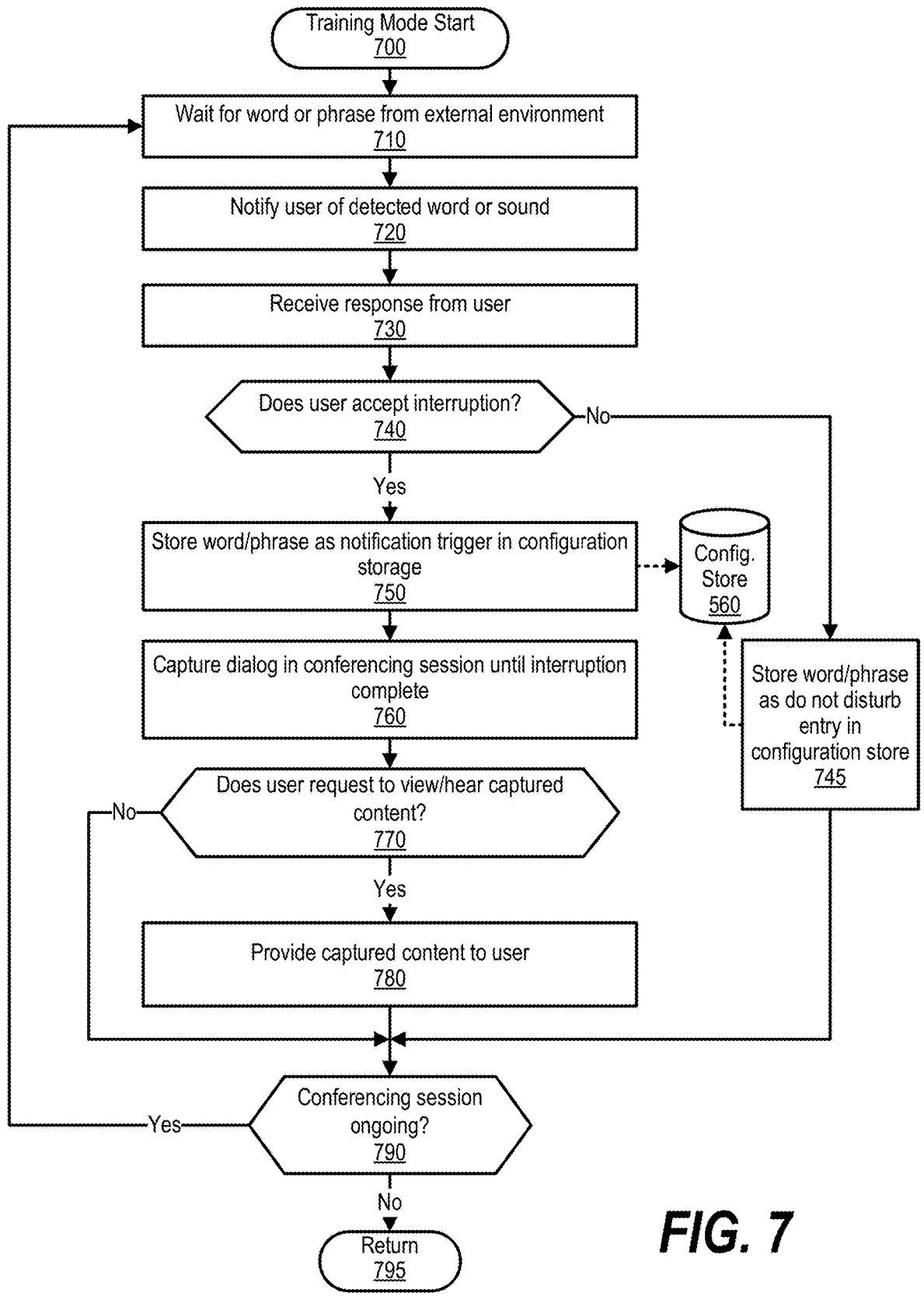
FIG. 7 is an exemplary flowchart showing steps taken to train an interruption manager.

Interruption manager 340 compares audible interruption 325 to a set of predefined notification triggers such as "Fire" or a speech pattern of user 300's supervisor (see FIGS. 4, 5, and 7 and corresponding text for further details). When a match is found, interruption manager 340 sends interruption notification 345 to user 300, which may be an audible tone sent over headset 310, a pop-up window shown on display 380, or both. In one embodiment, interruption notification 345 may include the name of person 320 (speech pattern match embodiment) and words corresponding to audible interruption 325 ("Hey Jim").

User 300 determines whether to accept or reject the interruption and sends interruption response 350 to interruption manager 340. In one embodiment, if user 300 does not respond in 30 seconds, interruption manager 340 may assume that user 300 has rejected audible interruption 325. When user 300 accepts the interruption, interruption manager 340 begins capturing content from the conferencing session of other users while user 300 is speaking with person 320. The captured content is stored in an information record for later retrieval.

When user 300 is finished with the interruption, user 300 sends interruption completed message 360 to interruption manager 340 accordingly (e.g., through spoken words, depressing a button on headset 310, making a pop-up window selection on display 380, etc.). In turn, interruption manager 340 provides user 300 with captured content 370 via textual representation using known speech-to-text conversion technology on display 380, headset 310 (audio representation), or both based on the user 300's configuration settings (see FIGS. 4, 6, and corresponding text for further details).

FIG. 4 is an exemplary diagram showing a configuration window to configure interruption manager 340. User 300 views window 400 and configures notification triggers, do not interrupt entries, and content capture configuration settings based on the user 300's preferences. Area 400 includes a non-exhaustive list of global keywords that user 300 may select as notification triggers. User 300 may also select whether user 300 wishes to be notified (via interruption notification 345) with an audio notification, visual notification, or both. In one embodiment, window 400 may allow user 300 to select specific audio or visual cues for specific notification triggers. For example, the notification trigger "fire" may generate a very loud audio notification and very bright visual notification, whereas the notification trigger "urgent" may generate a soft audio notification.

Area 420 includes a list of user-defined notification triggers. The user-defined notification triggers may include keywords, phrases, and audio files specifically defined by user 300. For example, a user may record their supervisor's voice and interruption manager 340 compares the recorded voice with surrounding audio to detect interruptions by the supervisor, regardless of what the supervisor says. In one embodiment, the user may configure audio file notification trigger settings so the user is interrupted only when the supervisor says the user's name.

Area 430 includes a list of user defined "do not interrupt" entries. The user may pre-configure these entries during a training session so interruption manager 340 understands not to interrupt user 300 when certain events occur, such as particular words or sounds (e.g., dog barking).

Area 440 includes configuration settings for a user to select a type of medium the user wishes interruption manager 340 to capture content while the user is tending to the interruption. The user may select "audio recording" so the user can hear the missed dialog over the headphones when the user is finished with the interruption. The user may also select "transcript of meeting discussion" so the user may read the missed dialog on display 380 when the user is finished with the interruption. The user may also select both options and then select which format to review the missed dialog after any given interruption.

FIG. 5 is an exemplary flowchart showing steps taken to configure interruption manager 340. FIG. 5 processing commences at 500 whereupon, at step 510, the process receives a request from user 300 to configure interruption manager 340. At step 520, the process displays a configuration window to user 300, such as configuration window 400 shown in FIG. 4. At step 530, the process receives configuration selections from user that may include global notification triggers, user-defined notification triggers, user-defined audio files, do not interrupt indicators, and etcetera.

At step 540, the process selects the first notification trigger and at step 550, the process stores the selected notification trigger with a selected interruption notification type in configuration store 560. As discussed earlier, the notification type may be an audible notification, a visual notification, or both audible and visual notification.

The process determines as to whether the user selected more notification triggers (decision 570). If there are more notification triggers to process, then decision 570 branches to the 'yes' branch which loops back to process and store the notification triggers with their corresponding notification type. This looping continues until there are no more notification triggers to process, at which point decision 570 branches to the 'no' branch exiting the loop. At step 580, the process stores content capture configuration information provided by the user in configuration store 560 (e.g., from selections 440 shown in FIG. 4). FIG. 5 processing thereafter ends at 595.

Figure 6:
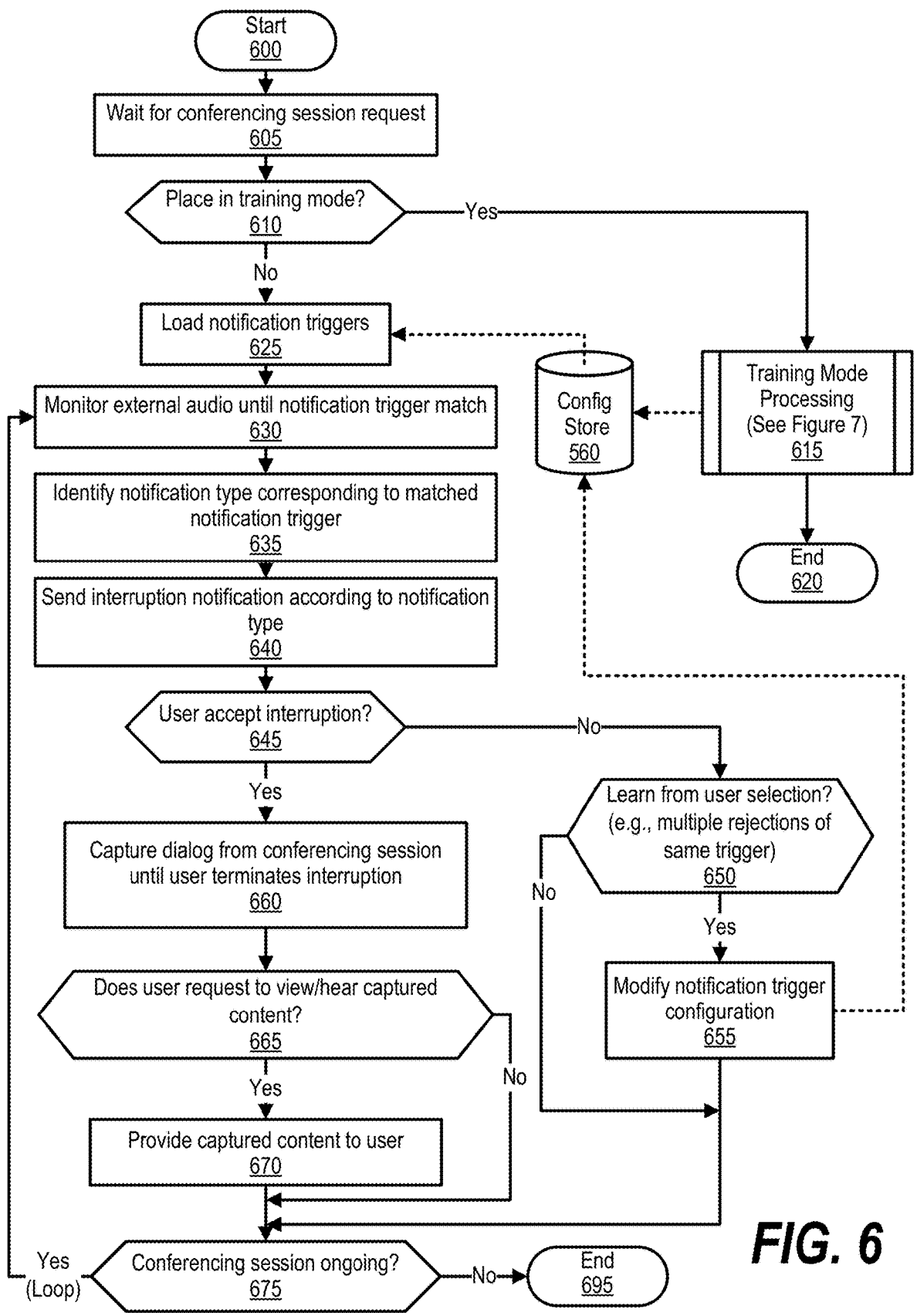
FIG. 6 is an exemplary flowchart showing steps taken to process external audible interruptions.

FIG. 6 is an exemplary flowchart showing steps taken to process external audible interruptions. FIG. 6 processing commences at 600 whereupon, at step 605, the process waits for a conferencing session request, such as the start of a video conference or audio conference. The process determines as to whether to enter training mode, such as when user 300 depresses a training mode button on headset 310 or selects training mode on a user interface window shown on display 380 (decision 610). For example, the user may training the system during the first week of service so the system understands which users (speech patterns) and/or words are important enough to interrupt user 300, and which users and/or words are not important enough to interrupt user 300.

If the process should enter training mode, then decision 610 branches to the 'yes' branch whereupon the process notifies user 300 of external audio and trains itself based on the user's responses (pre-defined process 614, see FIG. 7 and corresponding text for processing details). FIG. 6 processing thereafter ends at 620.

On the other hand, if the system should not be placed training mode, then decision 610 branches to the 'no' branch whereupon, at step 625, the process loads notification triggers from configuration store 560, which may also include do not disturb entries. At step 630, the process monitors surrounding audio until the surrounding audio includes information that matches a notification trigger (e.g., a matching word, audio file, etc.). At step 635, the process identifies a notification type corresponding to the matched notification trigger (e.g., audio notification or visual notification) and, at step 640, the process sends the interruption notification to user 300 according to the notification type.

The process receives an interruption response from user 300 and determines as to whether user 300 accepts the interruption (decision 645). If user 300 accepts the interruption, then decision 645 branches to the 'yes' branch. At step 660, the process captures a dialog from the conferencing session into an information record based on the pre-configured content capture selection until the interruption completes. In one embodiment, the process detects the end of the interruption through audio means, such as detecting the end of a conversation between user 300 and person 320. In another embodiment, user 300 provides an end of interruption indication through the headset or a user interface window.

The process determines as to whether the user wishes to view/hear the captured content (decision 665). If the user wishes to view/hear captured content, then decision 665 branches to the 'yes' branch whereupon, at step 670, the process provides the captured content to user 300, such as on a scrolling window on display 380. On the other hand, if the user does wish to view/hear the captured content, then decision 665 branches to the 'no' branch bypassing step 670.

Referring back to decision 645, if the user does not accept the interruption, then decision 645 branches to the 'no' branch, whereupon the process determines (e.g., via sending a request to user 300) as to whether to learn from user 300's selection (decision 650). For example, the word "important" may be one of user 300's notification triggers, but user 300 has rejected the past five interruption notifications pertaining to the word "important." In this example, the process may determine (or request from the user) to remove the notification trigger "important" from configuration store 560.

If the process should learn from the user selection, then decision 650 branches to the 'yes' branch whereupon, at step 655, the process modifies the notification trigger entries in configuration store 560. On the other hand, if the process should not learn from the user selection, then decision 650 branches to the 'no' branch bypassing step 655.

The process determines as to whether the conferencing session is still ongoing (decision 675). If the conferencing session is ongoing, then decision 675 branches to the 'yes' branch which loops back to continue to compare external audio to notification triggers. This looping continues until the conferencing session terminates (e.g., disconnection from conference call), at which point decision 675 branches to the 'no' branch exiting the loop. FIG. 6 processing thereafter ends at 695.

FIG. 7 is an exemplary flowchart showing steps taken to train interruption manager 340. Processing commences at 700 whereupon, at step 710, the process waits for a word or sound in proximity to surrounding area 330. For example, user 300 may wish to train interruption manage 340 in real-time and receive interruption notifications for every word or sound in proximity to user 300 for a short duration of time. At step 720, the process notifies user 300 of the detected word or sound and, at step 730, the process receives a response from user.

The process determines as to whether the user's interruption response indicates that the user accepts the interruption or rejects the interruption (decision 740). If the user does not accept the interruption, then decision 740 branches to the 'no' branch whereupon the process stores, in one embodiment, the word or sound as a do not interrupt entry in configuration store 560.

On the other hand, if the user accepts the interruption, then decision 740 branches to the 'yes' branch whereupon, at step 750, the process stores the word or sound as a notification trigger in configuration store 560. For example, user 300 may request their supervisor to say user 300's name so the supervisor's voice may be captured and stored as a notification trigger.

At step 760, the process captures the dialog between conferencing session participants based on the content capture configuration (e.g., audio/video capture) until the interruption is complete. The process then determines as to whether the user wishes to view/hear the captured content (decision 770). If the user wishes to view/hear the captured content, then decision 770 branches to the 'yes' branch whereupon, at step 780, the process provides captured content to user 300. On the other hand, if the user does not wish to view/hear the captured content, then decision 770 branches to the 'no' branch bypassing step 780.

The process determines as to whether the conferencing session is ongoing (decision 790). If the conferencing session is ongoing, then decision 790 branches to the 'yes' branch which loops back to continue training interruption manager 340 with external audio sounds. This looping continues until the conferencing session terminates, at which point decision 790 branches to the 'no' branch exiting the loop. FIG. 7 processing thereafter returns to the calling routine (see FIG. 6) at 795.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
    invoking a conferencing session over a computer network between a first user utilizing a headset with a microphone and one or more second users;
    monitoring, by the microphone, surrounding audio occurring in proximity to the first user;
    in response to the monitoring of the surrounding audio, detecting, by the microphone, an audible interruption spoken by a third user proximate to the first user, wherein the headset inhibits the first user from detecting the audible interruption;

providing an interruption notification to the first user in response to determining that the audible interruption matches at least one of a set of notification triggers;

capturing a dialog between the one or more second users in the conferencing session in response to the first user accepting the interruption notification;

detecting a different audible interruption;

sending a different interruption notification to the first user; and in response to the first user rejecting the different interruption notification, adding a do not interrupt entry to a set of do not interrupt entries, wherein each of the set of do not interrupt entries indicate not to interrupt the first user on a subsequent audible interruption matching one of the set of the do not interrupt entries.

2. The method of claim 1 further comprising:

creating an information record of the dialog between the one or more second users;

receiving an interruption completed indication from the first user indicating that the first user is finished conversing with the third user; and providing the information record to the first user in response to receiving the interruption completed indication.

3. The method of claim 2 wherein the information record is provided to the first user in a format selected from the group consisting of an audio format and a visual format.

4. The method of claim 1 further comprising:

initiating a training mode; and in response to initiating the training mode:

in response to the first user accepting the different interruption notification, adding a new notification trigger corresponding to the different audible interruption to the set of notification triggers.

5. The method of claim 4 wherein the new notification trigger is an audio recording of the third user.

6. The method of claim 1 wherein the interrupt notification provided to the first user identifies the third user and comprises one or more words from the audible interruption.

7. The method of claim 1 wherein the interruption notification is customizable by the first user for each of the set of notification triggers.

* * * * *